(12) United States Patent
Chetlur et al.

(10) Patent No.: US 11,244,575 B2
(45) Date of Patent: **\*Feb. 8, 2022**

(54) PROVIDING TARGETED, EVIDENCE-BASED RECOMMENDATIONS TO IMPROVE CONTENT BY COMBINING STATIC ANALYSIS AND USAGE ANALYSIS

(71) Applicant: International Business Machines Corporation, Armonk, NY (US)

(72) Inventors: Malolan Chetlur, Karnataka (IN); Prasenjit Dey, Bangalore (IN); Mukesh K. Mohania, Waramanga (AU); Chalapathy Neti, Yorktown Heights, NY (US); Satyanarayana V. Nitta, Westchester, NY (US); Robert J. Schloss, Briarcliff Manor, NY (US); Bikram Sengupta, Karnataka (IN)

(73) Assignee: International Business Machines Corporation, Armonk, NY (US)

( \* ) Notice: Subject to any disclaimer, the term of this patent is extended or adjusted under 35 U.S.C. 154(b) by 165 days.

This patent is subject to a terminal disclaimer.

(21) Appl. No.: 16/657,568

(22) Filed: Oct. 18, 2019

(65) Prior Publication Data

US 2020/0051449 A1 Feb. 13, 2020

Related U.S. Application Data

(63) Continuation of application No. 14/734,469, filed on Jun. 9, 2015.

(51) Int. Cl.
| | | |
|---|---|---|
| G09B 5/06 | (2006.01) | |
| G06F 9/54 | (2006.01) | |
| G06F 9/451 | (2018.01) | |

(52) U.S. Cl.
CPC ............... G09B 5/06 (2013.01); G06F 9/451 (2018.02); G06F 9/542 (2013.01)

(58) Field of Classification Search
None
See application file for complete search history.

(56) References Cited

U.S. PATENT DOCUMENTS

| | | |
|---|---|---|
| 8,019,777 B2 | 9/2011 | Hauser |
| 8,182,270 B2 | 5/2012 | Elzinga et al. |
| | (Continued) | |

OTHER PUBLICATIONS

Agrawal, R. et al., "Empowering Authors to Diagnose Comprehension Burden in Textbooks" KDD'12 (Aug. 12-16, 2012), Beijing, China, 9 pages.

(Continued)

*Primary Examiner* — William D Ermlick
(74) *Attorney, Agent, or Firm* — Scully, Scott, Murphy & Presser, P.C.; Joseph Petrokaitis (57) ABSTRACT

Providing targeted, evidence-based recommendations to improve digital content quality, in one aspect, may include partitioning digital content into a sequence of logical content modules. Quality scores for the logical content modules along a plurality of quality dimensions may be determined. User interactions with the digital content on a user interface are monitored. Raw events generated from user interaction in accessing the digital content are captured. Raw event patterns for the logical content modules are detected. The raw event patterns of user interaction are transformed into a set of dynamic states representing potential user experience and performance. The set of dynamic states are associated with a respective logical content module. The quality dimensions of the logical content modules and associated quality scores are correlated with the dynamic states.

18 Claims, 3 Drawing Sheets

(56) References Cited

U.S. PATENT DOCUMENTS

| | | | | |
|---|---|---|---|---|
| 8,834,166 | B1* | 9/2014 | Ionkov | G09B 7/06 434/178 |
| 9,536,439 | B1* | 1/2017 | Goldstein | G09B 7/00 |
| 9,680,945 | B1* | 6/2017 | Treves | G09B 7/04 |
| 9,760,607 | B1* | 9/2017 | Tweedy | G06F 40/253 |
| 9,965,776 | B2* | 5/2018 | Huang | G06Q 50/01 |
| 10,129,365 | B2* | 11/2018 | Silberstein | G06F 16/70 |
| 10,629,086 | B2* | 4/2020 | Chetlur | G06F 9/542 |
| 2003/0039948 | A1* | 2/2003 | Donahue | G09B 7/02 434/322 |
| 2003/0232316 | A1* | 12/2003 | Bookout | G09B 7/02 434/350 |
| 2004/0002039 | A1* | 1/2004 | Draper | G09B 7/04 434/118 |
| 2005/0125422 | A1* | 6/2005 | Hirst | G06N 5/04 |
| 2005/0203786 | A1* | 9/2005 | Jessup | G06Q 10/00 705/7.38 |
| 2006/0095841 | A1* | 5/2006 | Oikawa | G06F 16/93 715/205 |
| 2006/0147890 | A1* | 7/2006 | Bradford | G09B 7/00 434/362 |
| 2007/0160969 | A1* | 7/2007 | Barton | G09B 7/00 434/323 |
| 2010/0162286 | A1* | 6/2010 | Berry | H04N 21/252 725/14 |
| 2011/0029666 | A1* | 2/2011 | Lopatecki | H04N 21/44222 709/224 |
| 2011/0275046 | A1* | 11/2011 | Grenville | G09B 7/02 434/322 |
| 2012/0045744 | A1* | 2/2012 | Nickolai | G09B 7/00 434/322 |
| 2012/0219938 | A1* | 8/2012 | Al-Shammari | G09B 7/02 434/322 |
| 2012/0323843 | A1 | 12/2012 | Bice et al. | |
| 2012/0329027 | A1* | 12/2012 | Lewolt | G09B 7/00 434/322 |
| 2013/0004930 | A1* | 1/2013 | Sorenson | G09B 7/02 434/350 |
| 2013/0006717 | A1 | 1/2013 | Oleson et al. | |
| 2013/0073632 | A1* | 3/2013 | Fedorov | G06Q 50/01 709/205 |
| 2013/0246162 | A1* | 9/2013 | Brooks | G06N 20/00 705/14.43 |
| 2014/0019446 | A1* | 1/2014 | He | G06F 16/9535 707/725 |
| 2014/0024009 | A1* | 1/2014 | Nealon | G09B 5/12 434/362 |
| 2014/0040019 | A1* | 2/2014 | Zheng | G06Q 30/0246 705/14.45 |
| 2014/0057242 | A1* | 2/2014 | Sherman | G09B 7/00 434/353 |
| 2014/0115096 | A1* | 4/2014 | Burba | H04L 67/22 709/217 |
| 2014/0142397 | A1* | 5/2014 | Bedrosian | G06K 9/00302 600/301 |
| 2014/0147048 | A1* | 5/2014 | Yang | G06F 16/353 382/190 |
| 2014/0205984 | A1* | 7/2014 | Chapman | G09B 5/14 434/308 |
| 2014/0258025 | A1* | 9/2014 | Bouzid | G06Q 30/0251 705/26.7 |
| 2014/0272889 | A1* | 9/2014 | Kulkarni | G09B 5/08 434/350 |
| 2014/0289241 | A1* | 9/2014 | Anderson | G06F 16/48 707/736 |
| 2015/0050630 | A1* | 2/2015 | Hanlon | G09B 5/02 434/262 |
| 2015/0056598 | A1* | 2/2015 | Kutty | G09B 7/08 434/362 |
| 2015/0097938 | A1* | 4/2015 | Tsou | G06K 9/00604 348/78 |
| 2015/0139618 | A1* | 5/2015 | Chakra | H04N 21/252 386/287 |
| 2015/0170538 | A1* | 6/2015 | Shrubsole | G09B 19/00 434/236 |
| 2015/0206441 | A1* | 7/2015 | Brown | G09B 5/00 434/308 |
| 2015/0206447 | A1* | 7/2015 | Vahid | G06F 40/14 434/362 |
| 2015/0242978 | A1* | 8/2015 | Zaslavsky | G06F 16/2228 705/326 |
| 2015/0243176 | A1* | 8/2015 | Zaslavsky | G06Q 50/20 434/322 |
| 2015/0302755 | A1* | 10/2015 | Breck | G09B 5/12 434/362 |
| 2015/0331553 | A1* | 11/2015 | Shaffer | G06Q 30/0242 715/765 |
| 2015/0339588 | A1 | 11/2015 | Cardonha et al. | |
| 2015/0339941 | A1* | 11/2015 | Lu | G09B 5/12 434/309 |
| 2015/0370331 | A1* | 12/2015 | Gonzales, Jr. | G06F 3/013 345/156 |
| 2016/0034816 | A1* | 2/2016 | Contractor | G09B 5/06 706/46 |
| 2016/0180729 | A1* | 6/2016 | Boyer | G09B 7/00 434/350 |
| 2016/0364115 | A1* | 12/2016 | Joung | G06K 9/4604 |
| 2016/0381419 | A1* | 12/2016 | Zhang | H04N 21/4223 725/14 |
| 2017/0004721 | A1* | 1/2017 | Aleahmad | G09B 7/02 |
| 2017/0110153 | A1* | 4/2017 | Shynar | H04N 9/87 |
| 2017/0177718 | A1* | 6/2017 | Loganathan | G06F 16/78 |
| 2018/0068576 | A1* | 3/2018 | Calmon | G09B 7/00 |
| 2018/0330000 | A1* | 11/2018 | Noble | G09B 7/00 |
| 2020/0051449 | A1* | 2/2020 | Chetlur | G06F 9/451 |

OTHER PUBLICATIONS

Guo, P.H. et al., "How Video Production Affects Student Engagement: An Empirical Study of MOOC Videos" L@S (Mar. 4-5, 2014), Atlanta, GA, USA, 10 pages.

Kim, J. et al., "Understanding In-Video Dropouts and Interaction Peaks in Online Lecture Videos" L@S (Mar. 4-5, 2014), Atlanta, GA, USA, 10 pages.

List of IBM Patents or Patent Applications Treated as Related Dated Oct. 18, 2019, 2 Pages.

* cited by examiner

PROVIDING TARGETED, EVIDENCE-BASED RECOMMENDATIONS TO IMPROVE CONTENT BY COMBINING STATIC ANALYSIS AND USAGE ANALYSIS

FIELD

The present application relates generally to computers and computer applications, and more particularly to static analysis and usage analysis of digital content to provide evident-based recommendations to improve the content.

BACKGROUND

Across industries and geographies, the current trend is towards adopting digital content. The Education industry is witnessing widespread demand that is being served by traditional publishers and many new players. Some educational institutions are looking to switch from traditional textbooks in favor of digital learning, and there is a spike in digital content providers in different regions of the world.

BRIEF SUMMARY

A system and method in one embodiment may provide targeted, evidence-based recommendations that improve digital content quality. The system, in one aspect, may comprise one or more hardware processors and a memory device. The system may also comprise a content chunker operable to execute on one or more of the hardware processors and operable to partition digital content stored on the memory device into a sequence of logical content modules. The system may also comprise one or more content analyzers operable to execute on one or more of the hardware processors and further operable to measure quality scores for the logical content modules along a plurality of quality dimensions. The system may further comprise an instrumented content access platform operable to execute on one or more of the hardware processors, the instrumented content access platform operable to allow a user to access the digital content, the instrumented content access platform operable to capture raw events generated from user interaction with the instrumented content access platform in accessing the digital content. The system may also comprise pattern detector and summarizer operable to execute on one or more of the hardware processors, and further operable to detect and summarize raw event patterns for the logical content modules over a plurality of users, into a set of dynamic states representing potential user experience and performance. The system may also comprise a diagnosis module operable to execute on one or more of the hardware processors, and further operable to correlates the quality dimensions of the logical content modules and associated quality scores with the dynamic states.

A method of providing targeted, evidence-based recommendations to improve digital content quality, in one aspect, may comprise partitioning digital content stored in memory device into a sequence of logical content modules. The method may also comprise determining quality scores for the logical content modules along a plurality of quality dimensions. The method may also comprise monitoring user interactions with the digital content on a user interface by an instrumented content access platform. The method may also comprise capturing raw events generated from user interaction with the instrumented content access platform in accessing the digital content. The method may also comprise detecting raw event patterns for the logical content modules over a plurality of users. The method may also comprise transforming the raw event patterns of user interaction, into a set of dynamic states representing potential user experience and performance, and associating the set of dynamic states with a respective logical content module. The method may also comprise correlating the quality dimensions of the logical content modules and associated quality scores with the dynamic states. The method may also comprise providing a recommendation to modify the digital content based on the correlating.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Technology that can provide evidence-backed, targeted recommendations to improve digital content is useful, for example, to professional content providers and publishers. In educational context, for example, continuously improving digital content may provide for more successful and effective learning environment.

Techniques are presented that improve digital content quality based on recommendations that are acquired through both static analysis and dynamic usage analysis of content. In one embodiment of the present disclosure, a system and method may be provided that combine evidence collected from static analysis of content (content quality analysis) with evidence collected from dynamic content usage (usage/interaction analysis), and causally link the two for detecting and diagnosing issues with digital content. In one embodiment, the system and/or method analyze the content to measure different characteristics of content and generate a list of issues that reduce the quality/effectiveness of the content (static analysis). The system and/or method also track and analyze content usage (user action analysis) and feedback patterns to gather evidence and identify sections of content that require improvement (dynamic analysis). The system and/or method then correlate the results of the static and dynamic results to detect problems and provide recommendations on improving the content. The combination of static and dynamic analysis provides evidence-based recommendation.

A technique of the present disclosure in one embodiment includes running one or more algorithms or analyzers on the content to statically measure different characteristics of content and generate a list of issues that may reduce the perceived quality and effectiveness of the content. The one or more algorithms or analyzers may measure readability, comprehension burden, concept density, concept dispersion, illustrative richness, audio/video clarity, and other aspects of the content, for example, to identify issues such as poor readability, audio clarity, and others, which for example, may be fixed prior to release of the digital content.

The technique of the present disclosure in one embodiment also includes tracking and analyzing dynamic content usage and feedback patterns, and profiles of content users, to gather evidence and identify sections of content that need attention. For example, dynamic content usage and feedback patterns that may be tracked and analyzed may include readers (e.g., a threshold number of readers) skipping a part of the content, or spending very little time on it (e.g., a threshold amount of time), or spending too much time on it (e.g., another threshold amount of time), or going back and forth on it, or performing poorly on assessments related to a section (e.g., based on a threshold assessment score), or posting too many questions on it (e.g., a threshold number of questions), or expressing some negative sentiment on it, and others.

The technique of the present disclosure in one embodiment also includes correlating across the dynamic analysis signals (symptoms) and the static analysis measures (to identify possible causes) to diagnose problems, and provide targeted recommendations to improve content. In the presence of multiple analyzers of the same type (e.g., different algorithms for measuring readability, with different scores/output) this correlation also help evaluate the relative effectiveness of those multiple analyzers.

The following illustrate examples of correlating across the dynamic analysis signals (symptoms) and the static analysis measures to diagnose a problem. As an example, dynamic analysis signals may be discovered that indicate a section in digital content that many students skip or browse quickly. A static analysis measure of that content may uncover that the section of the content has poor illustrative richness. A problem may be identified as excessive text and a recommendation may be provided to make the text more engaging through illustrations.

As another example, dynamic analysis signals may be discovered that indicate a section in digital content that many students including top performers go back and forth over. A static analysis measure indicates that the content has high concept density. A recommendation may be provided to break up that section into separate sections of lesser density, or link with appropriate supplementary materials.

As another example, dynamic analysis signals may be discovered that indicate a section in digital content which many foreign language students go back and forth over. A static analysis measure indicates a low readability score among those students. A recommendation may be provided to use shorter sentences, less complex words, improve sentence structure.

As another example, dynamic analysis signals may be discovered that indicate a section in digital content in which students perform poorly on assessments. A static analysis measure indicates the section in question does not have any obvious content issue; however, an earlier section that is a pre-requisite for this section has a high comprehension burden and/or lacks readability. A recommendation may be provided to address relevant issues in the earlier section.

If no possible cause is detected, the symptom can be passed on to a human expert for manual diagnosis in one embodiment. This can reveal poor quality of existing analyzers and the need to improve them, or help identify the need for new types of analyzers not covered by existing set.

In one embodiment, the technique may also include generating a report on content modules that are successful, e.g., with satisfactory quality dimensions as well as high user experience and performance.

Figure 1:
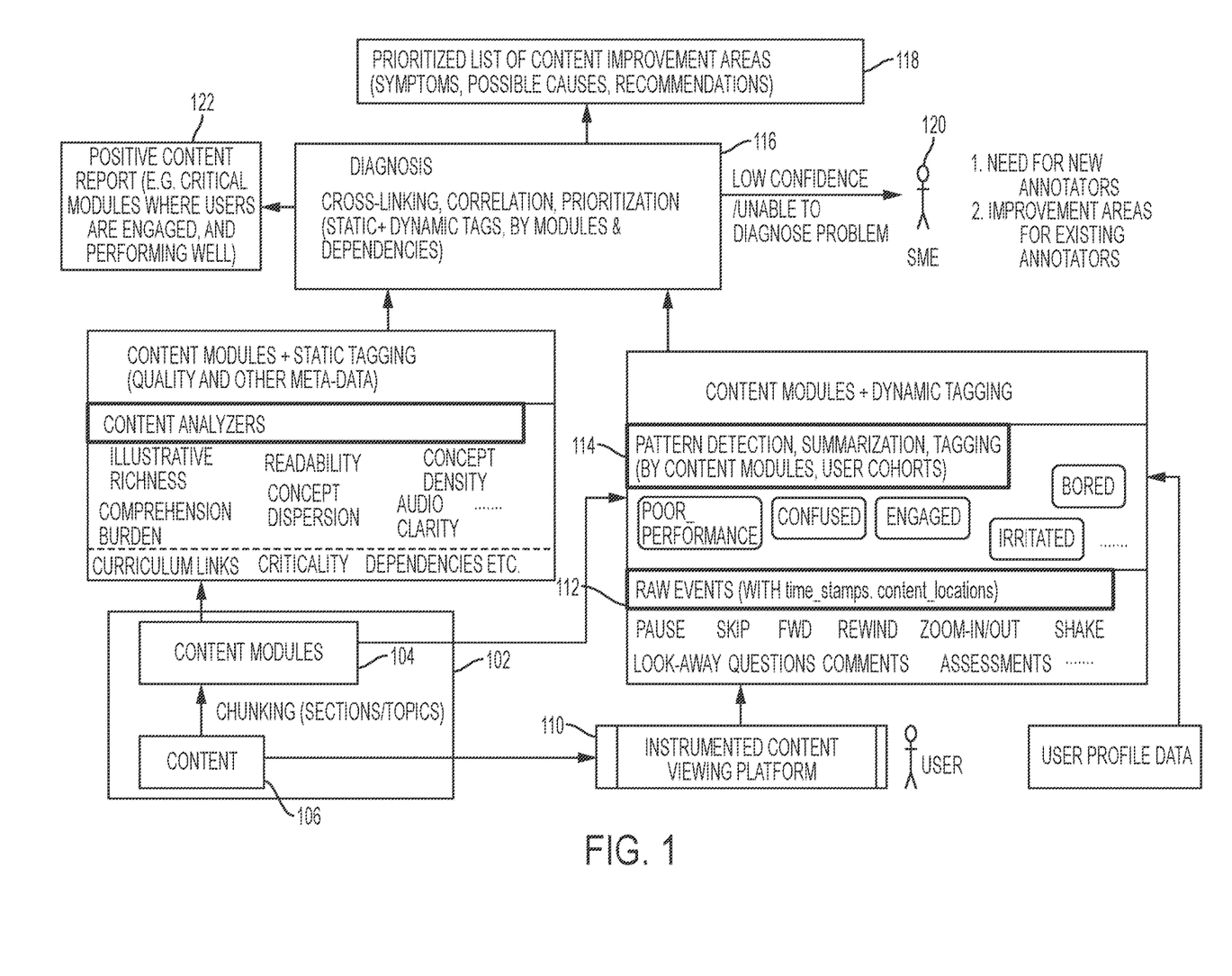
FIG. 1 is a diagram showing system architecture of a system that provides targeted evidence-based recommendation for digital content improvement in one embodiment of the present disclosure.

FIG. 1 is a diagram showing system architecture of a system that provides targeted evidence-based recommendation for digital content improvement in one embodiment of the present disclosure. A content chunker 102 partition digital content stored on the memory device into a sequence of logical content modules, e.g., each logical content module in the sequence of logical content modules having a quality measure that can be addressed independently of another logical content module in the sequence of logical content modules. For example, the content chunker 102 generates logical modules 104 of a content 106, e.g., section/subsection/paragraph of text, images, video-segments, for example, by time-stamps, concept areas, and others.

One or more content analyzers 108 measure quality scores for a logical content module along a plurality of quality dimensions, for example, for each of the logical content modules in the sequence of content modules. One or more content analyzers 108 may include a set of algorithms that run on content modules 104 and generate meta-data/tags on various dimensions of content quality by module. For example, the content modules may be tagged with dimensions of content and associated quantified scores that indicate the content quality with respect to a dimension. Examples of dimensions may include but are not limited to illustrative richness, readability, concept density, comprehension burden concept dispersion, and audio clarity, and/or others. Additional meta-data or tags that are associated with a content module may include curriculum links (e.g., what curriculum standard and instruction the content module may be linked to), criticality (e.g., importance factor of the content module), dependency (e.g., whether and to which other content module(s) the content module depends on), and/or others.

An instrumented content access platform 110 in one embodiment allows a user to access the digital content 106 and captures raw events generated from user interaction with the instrumented content access platform 110 in accessing the digital content. For example, the instrumented content viewing platform 110 generates streams of raw events 112 as a user interacts with digital content 106. For example, the instrumented content viewing platform 110 detects user actions on the content (e.g., user actions on a user interface screen when presented with the content) such as pause, skip, forward, rewind, zoom-in, zoom-out, shake, look-away, questions. Instrumented content viewing platform 110, for example, may execute on a processor, and monitor user actions associated with the content presented on a computer, for example, on a display screen via a user interface. User actions for example may include input actions, via keyboard, mouse, touch screen, gesture and other input actions via input devices. The instrumentation is achieved through a set of sensors, which may be at an application or device level. Application level sensors are embedded into the application (content player) code and capture user interaction events with the application such as pause, stop, fast-forward, play, rewind, zoom-in/out, etc. Device level sensors are generally part of the platform through which the user accesses content such as camera, microphone, accelerometer, gyroscope, ambient noise/sound detection, biometric sensors and so on, for example, installed in learning platforms such as those that are mobile/tablet based. Device level sensors may also include sensors that are not directly part of the platform, but are external to it and can send raw events for analysis as the user engages in learning (e.g., user wearables, skin conductance, etc.). The instrumented content viewing platform 100 may also determine or receive user's comments, assessment scores, and other results related to the content. The instrumented content viewing platform 100 generates streams of raw events 112 based on the detected user actions and results with time stamps and content locations. The instrumented content viewing platform 110 in one embodiment is executable on one or more processors and may include user interface for interacting with a user and instrumentation that monitors and detects the user interactions with the user interface.

A pattern detection/summarization component 114 in one embodiment may aggregate raw events, detect and summarize raw event patterns for a logical content module over a plurality of users and user cohorts, into a set of dynamic states representing potential user experience and performance, e.g., for each of the logical content modules in the sequence of logical content modules. For example, the pattern detection/summarization component 114 groups raw events per user into buckets by content module (e.g., using meta-data such as event location, time-stamps, and/or others tagged with the content module). The pattern detection/summarization component 114 in one embodiment detects signals/patterns (e.g., repeatedly viewing a part of the content, skipping a part of the content, expressing a sentiment, poor score in a relevant assessment, etc.).

The pattern detection/summarization component 114 in one embodiment aggregates over multiple users and cohorts (e.g., by demography, geography, performance etc), and summarizes the detected patterns into states, e.g., many repeated views of this content and/or negative sentiments <confused/irritated>; many students skipping this content <bored>; many foreign language students receive poor scores in assessment <poor-performance: English as second language (ESL)>; etc. In presence of evidence, the pattern detection/summarization component 114 in one embodiment generates meta-data/tags on various perceived problem states by content module. The pattern detection/summarization component 114 in one embodiment is a computer executable component executable on one or more processors. A pattern is a sequence of events indicative of a user's cognitive and/or affective states. Cognitive states are related to concept understanding and skill development of the user and are manifested in the correctness of the responses the user gives to assessment items as part of the learning activity on the platform. Based on the complexity of the questions and the user's performance in answering them, the events (sequences of questions and answers) may be abstracted out into higher-level knowledge/performance states such as outstanding/average/poor performance. Affective states are related to the user emotion/sentiment while engaged in the learning activity. A pattern of events may be indicative of such a state for example, repeated rewind of a portion of the content may be indicative of a confused state, shaking of the device may be indicative of irritation, repeated fast forward, or looking away from the device for prolonged periods indicative of boredom, etc. The cognitive and affective signals may also be combined to infer user states with higher confidence e.g., poor quiz performance and repeated rewinds may be indicative of confusion, whereas repeated rewinds followed by positive sentiment/comment expressed may indicate that the user found the specific portion of the content to be very engaging. Such inference may be driven by rules, at least to begin with. They can also be informed by existing research on cognitive/affective states. The system can also allow a facility to the users to self-report states as part of the learning activity. This can, over time, lead to a rich corpus of labeled data, and supervised classification techniques may be used to build predictive models of user states using which new event sequences may be analyzed and classified. The user profile data is used to group together users into cohorts (e.g., based on demography, education achievement levels, etc.) since the patterns/states exhibited by different cohorts of users when engaged in a learning activity, may show similarities within a cohort (and differences across) that may help in generating more useful dynamic tags for the content modules. For example, the same content module in English may lead to a confused state for those having English as a second language, but a neutral/engaged state for those who are native speakers in English. This can provide finer-grained information on the "symptoms" that are reported by dynamic usage analysis.

The information processed accordingly by the content analyzers 108 and pattern detection summarization component 114 may be communicated to a diagnosis component 116. The diagnosis component 116, e.g., cross-links and correlates the quality dimensions (static analysis) of content with the dynamic states, to infer possible causes of unsatisfactory user experience/performance. The diagnosis component 116 may provide a list of content modules of the digital content with their static tags and dynamic tags. The diagnosis component 116 in one embodiment checks static tags (e.g., tags generated by the content analyzers 108) and dynamic tags (e.g., tags generated by the pattern detection summarization component 114) for each content module. For example, diagnosis component 116 may check for the tags after sufficient content usage have been processed by the pattern detection/summarization component 114 and/or as the pattern detection/summarization component 114 processes more content usage. The diagnosis component 116 checks a content module and if there are no problematic tags (i.e., no tag suggests a problem) in the content module being check, the diagnosis component 116 moves to the next content module to check for static tags and dynamic tags.

In one aspect, if there are no problematic dynamic tags but problematic static tags, the diagnosis component 116 may prioritize content quality issue as Low. If there are problematic static and dynamic tags, the diagnosis component 116 may use a ranking/prioritization scheme based on the perceived impact of the issue as can be inferred from the tags. A ranking/prioritization scheme may be based on category rules: e.g., <poor performance> issues get precedence over <confused>, which gets precedence over <bored> and so on.

In one embodiment, further prioritization may be performed based on the nature and degree of evidence, e.g., criticality of the content module on which the problem has been identified, number of users who displayed the behavior, and/or other evidence. In one embodiment, the prioritization scheme can be completely rule-based, or it may employ an objective function to optimize the above criteria. There are a number of dimensions (examples of criteria) along which one can rank the problems that are diagnosed, e.g., user states (poor performance, confused, bored), nature/degree of evidence for each problem, criticality of the module where a problem occurs. This ranking can be based on rules. It can also be based on giving weights to the different criteria, using an objective function to compute the overall importance of a problem by combining its constituent scores, and ranking based on the final scores.

The diagnosis component 116 may also investigate whether static tag values can explain a dynamic tag. For example, <poor performance>: ESL dynamic tag may be due to poor readability (identified by the content module's static tag), rather than concept dispersion, for example, if everyone else is performing at acceptable level; negative sentiments with word "audio" is likely to be due to low audio clarity score (indicated by the content module's static tag), rather than low illustrative richness score. Explanation may be provided based on rules which correlate a dynamic tag type with the most likely static tag types (causes). At run-time, given dynamic tags generated for a module, the computer will look at the static tags linked to the module (or its predecessors) and select the ones (static tags) that help explain the observed dynamic tags.

Based on the correlating static and dynamic problem tags, the diagnosis component 116 provides recommendations to address the issue. For example, a prioritized list of content improvement 118 areas may be provided. The prioritized list may include symptoms, possible causes, and recommendations for a given content or content module. For example, readability may be improved by having shorter sentences, using simpler words; comprehension burden may be improved by sufficiently explaining a concept prior to use. More specific guidance may be provided based on analyzer output and inference path, if available (e.g., explanation of how a specific score was derived).

If there are problematic dynamic tags, but no problematic static tag, diagnosis may be run using problematic static tags of prior content modules (on which the current module depends). If problems cannot be diagnosed automatically based on the dynamic and static tags, the content module and the tags associated with the content module may be transferred to a human expert (e.g., subject matter expert) 120, e.g., via a user interface. In another aspect, a positive content report 122 may be provided that for example lists content modules where users are engaged and performing well. The diagnosis component 116 is a computer executable component and may provide reports or lists, e.g., as described above in an electronic document form saved in memory, and/or via a user interface, e.g., display the report or lists on a user interface screen.

The one or more content analyzers, pattern detection summarization component, and diagnosis component are processing components that execute on a hardware processor, for example, central processing unit, or a configurable hardware such as field programmable gate array (FPGA) or another hardware processor.

A prioritization mechanism may be utilized by which unsatisfactory user states may be ranked based on their potential impact, considering the nature (characteristics) of the states, the nature (characteristics) of the modules, and the nature (characteristics) and degree of evidence in favor of the states. In one aspect, ranking may be based on one or more rules and/or objective functions.

The system and method of the present disclosure in one embodiment combine approaches to measuring content quality that rely on static analysis of the content from multiple dimensions with dynamic usage of the content. The system and method of the present disclosure in one embodiment diagnose problems in digital content, correlate content quality analysis and usage/interaction analysis to detect problems or to perform problem analysis, for example, grouping interaction patterns by users, user cohorts. In one embodiment of the present disclosure, real evidence that users found the digital content problematic, for example, detected by performing dynamic monitoring and analysis of user actions on computer-user interface, is used to determine content problems or potential content problems, for example, determine whether a user found or potentially will find a content difficult to read (readability), or do not or potentially will not understand a concept (e.g., due to concept density/dispersion/burden), or find or potentially find a content boring (e.g., due to lack of illustrations). The system and method of the present disclosure may help digital content providers to also determine which content should be acted upon, for example, based on a prioritization list of ranked content modules. The digital content may then be modified for improvement per recommendations of the system and method of the present disclosure.

Figure 2:
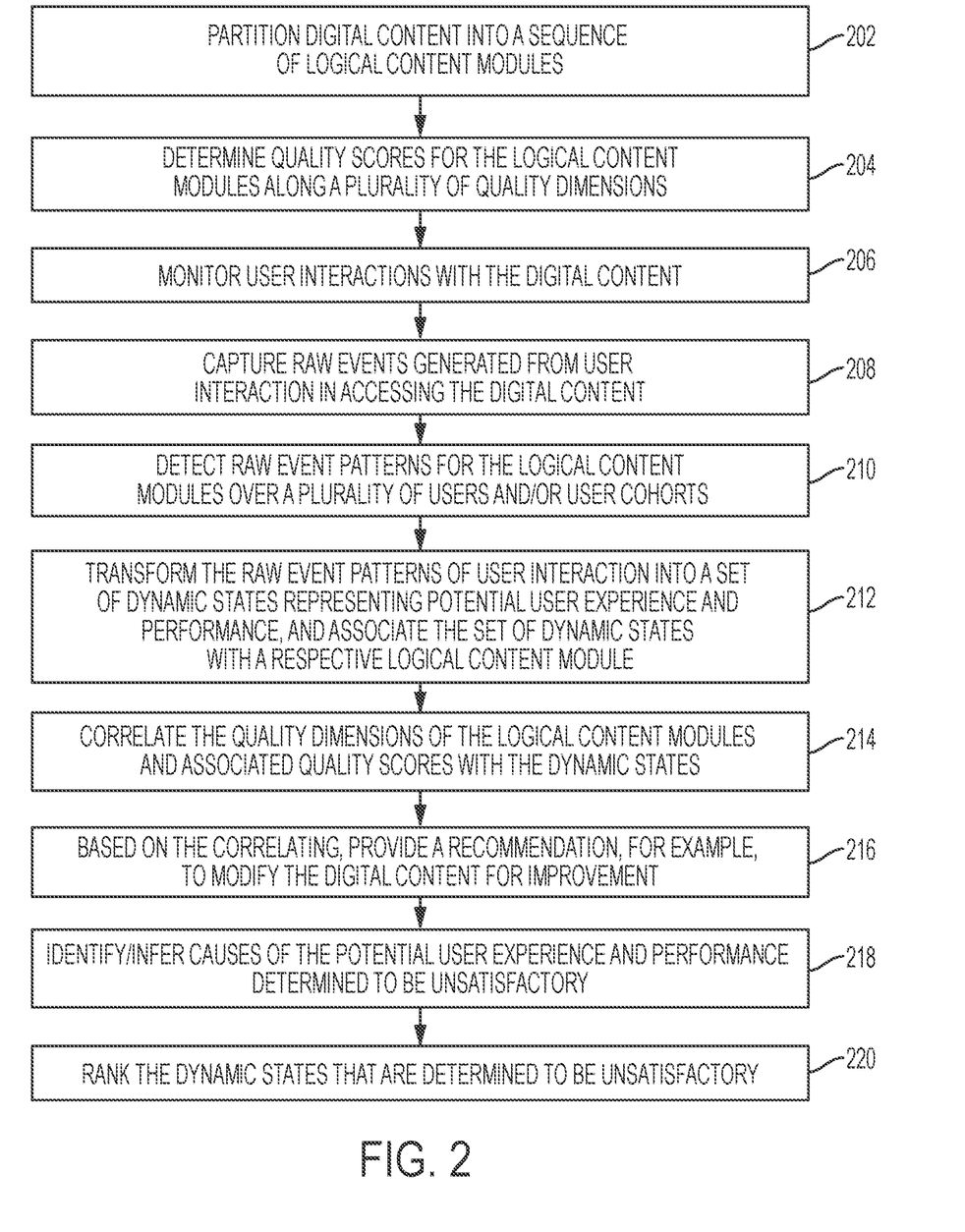
FIG. 2 is a flow diagram illustrating a method of providing targeted, evidence-based recommendations to improve digital content quality in one embodiment of the present disclosure.

FIG. 2 is a flow diagram illustrating a method of providing targeted, evidence-based recommendations to improve digital content quality in one embodiment of the present disclosure. At 202, digital content, e.g., stored in memory device, may be partitioned into a sequence of logical content modules, for example, as described above with respect to FIG. 1. At 204, quality scores may be determined for the logical content modules along a plurality of quality dimensions. For instance, each of the logical content modules may have one or more quality dimensions and associated quality score. In one aspect, the quality scores may be measured by one or more content analyzers as described above with respect to FIG. 1. At 206, user interactions with the digital content, e.g., on a user interface, may be monitored by an instrumented content access platform. For example, the user interface or the like may be instrumented with code to capture the user input actions. At 208, raw events generated from user interaction with the instrumented content access platform in accessing the digital content are captured, e.g., by the instrumented code. At 210, raw event patterns for the logical content modules over a plurality of users and/or user cohorts are detected. For instance, for each logical content module, raw event patterns of a plurality of users and/or user cohorts are detected. At 212, the raw event patterns of user interaction are transformed into a set of dynamic states representing potential user experience and performance, and the set of dynamic states is associated with a respective logical content module. At 214, the quality dimensions of the logical content modules and associated quality scores with the dynamic states are correlated. At 216, based on the correlating, a recommendation may be provided, for example, to modify the digital content for improvement. At 218, causes of the potential user experience and performance determined to be unsatisfactory may be inferred. At 220, the dynamic states that are determined to be unsatisfactory may be ranked based on potential impact by considering characteristic of the dynamic states, characteristic of the content modules, and characteristic and degree of evidence supporting the dynamic states In one aspect, the partitioning and the determining of the plurality of dimensions and quality scores may be performed as part of a static analysis, and may be performed off-line. In one aspect, the correlating of the quality dimensions and dynamic states may be performed off-line based on the generated dynamic states and quality dimensions (static states) of the logical content modules.

Figure 3:
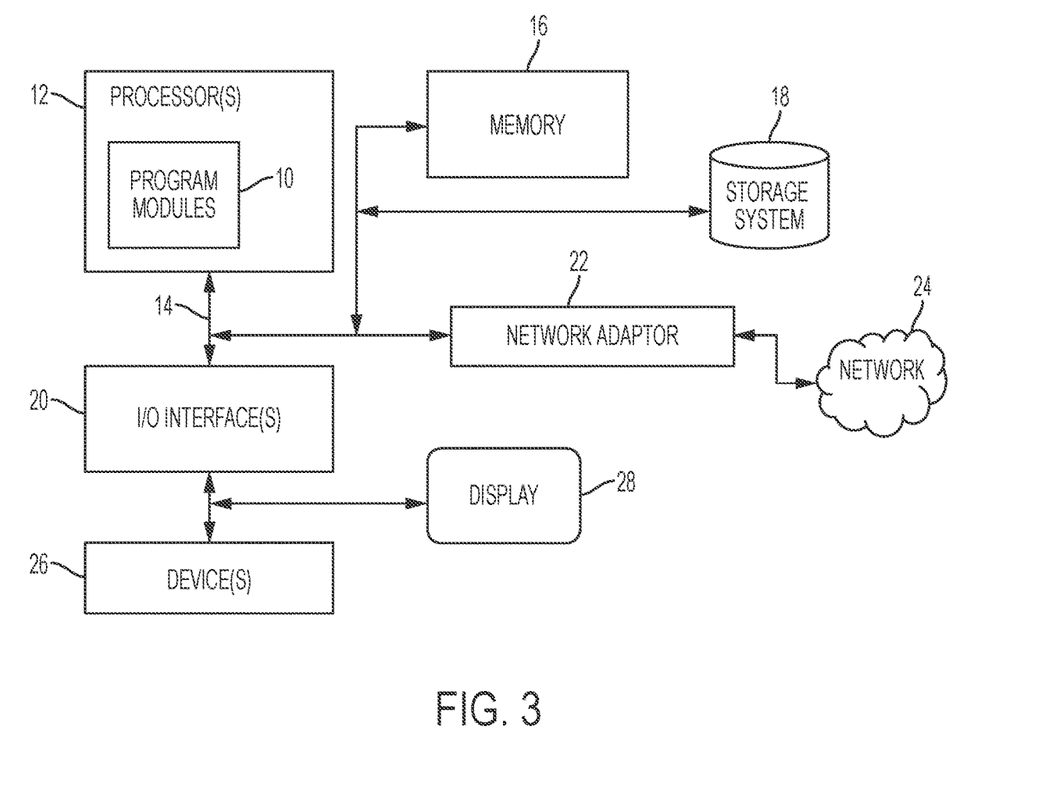
FIG. 3 illustrates a schematic of an example computer or processing system that may implement a system that provides targeted, evidence-based recommendations to improve digital content quality, in one embodiment of the present disclosure.

FIG. 3 illustrates a schematic of an example computer or processing system that may implement a system that provides targeted, evidence-based recommendations to improve digital content quality, in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include one or more components 10 that perform the methods described herein. The one or more components 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a program module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:
1. A system comprising:
at least one hardware processor;
a memory device coupled with the at least one hardware processor;
a content chunker operable to execute on the at least one hardware processor and operable to partition digital content stored on the memory device into a sequence of logical content modules;
the at least one hardware processor utilizing quality scores for the logical content modules along a plurality of quality dimensions, to tag a quality score associated with a quality dimension to a content module in the sequence of logical content modules;
an instrumented content access platform coupled with a set of sensors and operable to execute on the at least one hardware processor, the instrumented content access platform operable to allow a user to access the digital content, the instrumented content access platform operable to capture raw events generated from user interaction with the instrumented content access platform in accessing the digital content, the instrumented content access platform operable to detect via at least one of the set of sensors user actions on the digital content, the user actions including at least a rewind action on a user interface;

a pattern detector and summarizer operable to execute on the at least one hardware processor, and further operable to detect and summarize raw event patterns for the logical content modules over a plurality of users, into a set of dynamic states representing potential user experience and performance;

a diagnosis module operable to execute on the at least one hardware processor, and further operable to correlate the quality dimensions of the logical content modules and associated quality scores with the dynamic states, and given a dynamic state of a user consuming a content module, the diagnosis module further operable at run-time to infer, responsive to finding that the dynamic state does not correlate to at least one of the quality scores associated with the content module, a correlation of the dynamic state to a quality score associated with a pre-requisite content module occurring prior to the content module in the sequence of logical content modules, wherein responsive to determining that the quality scores associated with the content module are indicative of a problem, but the dynamic state of the content module is not indicative of a problem, the at least one hardware processor is operable to prioritize content quality issue as being low.

2. The system of claim 1, wherein the diagnosis module is further operable to interpret different static and dynamic tags based on rules to infer causes of said potential user experience and performance determined to be unsatisfactory.

3. The system of claim 1, wherein the diagnosis module is further operable to rank the dynamic states that are determined to be unsatisfactory based on potential impact by considering a characteristic of the dynamic states, a characteristic of the content modules, and a characteristic and degree of evidence supporting the dynamic states.

4. The system of claim 1, wherein the content chunker partitions the digital content into the sequence of logical content modules, wherein a logical content module in the sequence of logical content modules has a quality measure that can be addressed independently of another logical content module in the sequence of logical content modules.

5. The system of claim 1, wherein the plurality of quality dimensions comprises readability, concept density, comprehension burden, concept dispersion, audio clarity, illustrative richness, and meta-data comprising content module criticality, links, and dependencies.

6. The system of claim 1, wherein the pattern detector and summarizer summarizes the raw event patterns for the logical content modules over user cohorts.

7. A computer-implemented method, comprising:

partitioning digital content stored on a memory device into a sequence of logical content modules;

utilizing quality scores for the logical content modules along a plurality of quality dimensions, to tag a quality score associated with a quality dimension to a content module in the sequence of logical content modules;

capturing raw events generated from user interaction with an instrumented content access platform in accessing the digital content, wherein at least one sensor device detects user actions on the digital content during the user interaction, the user actions including at least a rewind action on a user interface;

detecting and transforming raw event patterns for the logical content modules over a plurality of users, into a set of dynamic states representing potential user experience and performance;

correlating the quality dimensions of the logical content modules and associated quality scores with the dynamic states; and given a dynamic state of a user consuming a content module and responsive to finding that the dynamic state does not correlate to at least one of the quality scores associated with the content module, automatically inferring at run-time by a processor, a correlation of the dynamic state to a quality score associated with a pre-requisite content module occurring prior to the content module in the sequence of logical content modules, wherein responsive to determining that the quality scores associated with the content module are indicative of a problem, but the dynamic state of the content module is not indicative of a problem, prioritizing content quality issue as being low.

8. The method of claim 7, further comprising:

interpreting different static and dynamic tags based on rules to infer causes of said potential user experience and performance determined to be unsatisfactory.

9. The method of claim 7, further comprising ranking the dynamic states that are determined to be unsatisfactory based on a potential impact by considering a characteristic of the dynamic states, a characteristic of the content modules, and a characteristic and degree of evidence supporting the dynamic states.

10. The method of claim 7, wherein a logical content module in the sequence of logical content modules has a quality measure that can be addressed independently of another logical content module in the sequence of logical content modules.

11. The method of claim 7, wherein the plurality of dimensions comprises readability, concept density, comprehension burden, concept dispersion, audio clarity, illustrative richness, and meta-data comprising content module criticality, links, and dependencies.

12. The method of claim 7, wherein responsive to determining that a logical content module's dynamic state is indicative of a problem but a logical content module's quality dimensions are not indicative of any problem, using a previous logical content module's quality dimensions in the correlating.

13. A computer program product comprising a computer readable storage medium having program instructions embodied therewith, the program instructions executable by a device to cause the device to:

partition digital content stored on a memory device into a sequence of logical content modules;

utilize quality scores for the logical content modules along a plurality of quality dimensions, to tag a quality score associated with a quality dimension to a content module in the sequence of logical content modules;

capture raw events generated from user interaction with an instrumented content access platform in accessing the digital content, wherein at least one sensor device detects user actions on the digital content during the user interaction, the user actions including at least a rewind action on a user interface;

detect and transform raw event patterns for the logical content modules over a plurality of users, into a set of dynamic states representing potential user experience and performance;

correlate the quality dimensions of the logical content modules and associated quality scores with the dynamic states; and given a dynamic state of a user consuming a content module and responsive to finding that the dynamic state does not correlate to at least one of the quality scores associated with the content module, automatically infer at run-time by a processor, a correlation of the dynamic state to a quality score associated with a pre-requisite content module occurring prior to the content module in the sequence of logical content modules, wherein responsive to determining that the quality scores associated with the content module are indicative of a problem, but the dynamic state of the content module is not indicative of a problem, the device is further caused to prioritize content quality issue as being low.

14. The computer program product of claim 13, wherein the device is further caused to:

interpret different static and dynamic tags based on rules to infer causes of said potential user experience and performance determined to be unsatisfactory.

15. The computer program product of claim 13, wherein the device is further caused to rank the dynamic states that are determined to be unsatisfactory based on a potential impact by considering a characteristic of the dynamic states, a characteristic of the content modules, and a characteristic and degree of evidence supporting the dynamic states.

16. The computer program product of claim 13, wherein a logical content module in the sequence of logical content modules has a quality measure that can be addressed independently of another logical content module in the sequence of logical content modules.

17. The computer program product of claim 13, wherein the plurality of dimensions comprises readability, concept density, comprehension burden, concept dispersion, audio clarity, illustrative richness, and meta-data comprising content module criticality, links, and dependencies.

18. The program product of claim 13, wherein responsive to determining that a logical content module's dynamic state is indicative of a problem but a logical content module's quality dimensions are not indicative of any problem, the device is further caused to use a previous logical content module's quality dimensions in the correlating.

* * * * *